United States Patent
Saund et al.

(10) Patent No.: US 10,102,131 B2
(45) Date of Patent: Oct. 16, 2018

(54) PROACTIVE POWER MANAGEMENT FOR DATA STORAGE DEVICES TO REDUCE ACCESS LATENCY

(71) Applicant: Apple Inc., Cupertino, CA (US)

(72) Inventors: Gurjeet S. Saund, Saratoga, CA (US); Peter F. Holland, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 186 days.

(21) Appl. No.: 14/870,272

(22) Filed: Sep. 30, 2015

(65) Prior Publication Data

US 2017/0091100 A1 Mar. 30, 2017

(51) Int. Cl.
| | |
|---|---|
| *G06F 12/08* | (2016.01) |
| *G06F 1/32* | (2006.01) |
| *G06F 12/0831* | (2016.01) |
| *G06F 12/0897* | (2016.01) |
| *G09G 5/00* | (2006.01) |

(52) U.S. Cl.
CPC ........ *G06F 12/0831* (2013.01); *G06F 1/3218* (2013.01); *G06F 1/3265* (2013.01); *G06F 1/3275* (2013.01); *G06F 1/3287* (2013.01); *G06F 12/0897* (2013.01); *G09G 5/00* (2013.01); *G06F 2212/1016* (2013.01); *G06F 2212/1028* (2013.01); *Y02D 10/13* (2018.01)

(58) Field of Classification Search
CPC .. G06F 12/0831; G06F 12/08; G06F 12/0802; G06F 12/0815; G06F 2212/621; G06F 2212/603; G06F 2212/302; G06F 1/3275; G06F 1/3287
See application file for complete search history.

(56) References Cited

U.S. PATENT DOCUMENTS

| | | | | |
|---|---|---|---|---|
| 5,446,904 A | * | 8/1995 | Belt | ......................... G06F 1/24 713/323 |
| 7,840,827 B2 | | 11/2010 | Dahan et al. | |
| 7,937,606 B1 | * | 5/2011 | Garlick | ................ G06F 1/3203 710/19 |
| 7,991,939 B1 | | 8/2011 | Tsu et al. | |
| 8,760,459 B2 | | 6/2014 | Hedges | |
| 2004/0215901 A1 | * | 10/2004 | Gaither | ............... G06F 12/0811 711/146 |
| 2004/0257996 A1 | * | 12/2004 | Choi | ..................... H04W 74/06 370/235 |

(Continued)

*Primary Examiner* — Michael Krofcheck
(74) *Attorney, Agent, or Firm* — Meyertons Hood Kivlin Kowert and Goetzel PC; Rory D. Rankin

(57) ABSTRACT

Methods and mechanisms for improved performance in a system with power management are described. A system includes a data storage device configured to store data and a display control unit configured to retrieve data from the data storage device. The data storage device may be placed in a reduced power state that results in increased latencies for accessing data within the device. The display control unit is configured to monitor an amount of data available for processing within the display control unit. In response to determining the amount of data has fallen to a threshold level, and in anticipation of a forthcoming data access request, the display control unit conveys an indication that prevents the data storage device from entering or remaining in the reduced power state. Subsequently, the display control unit conveys a request for data to the data storage device which will not be in the reduced power state.

20 Claims, 7 Drawing Sheets

(56) References Cited

U.S. PATENT DOCUMENTS

| | | | |
|---|---|---|---|
| 2005/0198542 A1* | 9/2005 | Freker | G06F 1/3203 |
| | | | 713/320 |
| 2006/0259791 A1* | 11/2006 | Dockser | G06F 1/3228 |
| | | | 713/300 |
| 2007/0109292 A1* | 5/2007 | Dahan | G09G 5/363 |
| | | | 345/211 |
| 2007/0113015 A1* | 5/2007 | Moll | G06F 1/3203 |
| | | | 711/135 |
| 2007/0253451 A1* | 11/2007 | Koob | H04L 1/1883 |
| | | | 370/508 |
| 2008/0186319 A1 | 8/2008 | Boner | |
| 2012/0079503 A1* | 3/2012 | Dally | G06F 9/3851 |
| | | | 718/108 |

\* cited by examiner

PROACTIVE POWER MANAGEMENT FOR DATA STORAGE DEVICES TO REDUCE ACCESS LATENCY

BACKGROUND

Technical Field

Embodiments described herein relate to the field of digital systems and, more particularly, to improved performance is systems that include power management mechanisms.

Description of the Related Art

Digital systems of various types often include, or are connected to, a display for the user to interact with the device. The display can be incorporated into the device. Examples of incorporated displays include the touchscreen on various smart phones, tablet computers, or other personal digital assistants. Another example of the incorporated display is a laptop with the screen in the lid. The display can also be connected to the device via a cable. Examples of the connected display include various desktop computers and workstations having a separate display that resides on the desk in front of the user. Some desktops also have an incorporated display (e.g., various iMac® computers from Apple Inc.). The display provides a visual interface that the user can view to interact with the system and applications executing on the system. In some cases (e.g., touchscreens), the display also provides a user interface to input to the system. Other user input devices (e.g., keyboards, mice or other pointing devices, etc.) can also be used.

Increasingly, devices use power management in order to reduce power consumption. In some cases the devices may rely on power supplied by a battery and power management techniques may prolong the operating time of the device before recharging of the battery is required. In other cases, power management may be utilized to reduce power consumption for ecological reasons. In yet other cases, power management may be performed for a combination of the foregoing reasons, or other reasons. Whatever the reason for using power management, it is often the case the there is a tradeoff between power consumption and performance as a reduction in power consumption often results in a reduction in performance. Consequently, improved methods for determining when and how to utilize power management are desirable.

SUMMARY

Embodiments are contemplated wherein a system includes a data storage device configured to store data and a display control unit configured to retrieve data from the data storage device. The data storage device is configured to support multiple power states, including a reduced power state. While in the reduced power state, an access to the storage device may have an increased access latency as compared to when the storage device is not in the reduced power state. The display control unit is configured to fetch data from the storage device for processing and includes a buffer to store data that is being processed. If the amount of data in the buffer falls too low, then an underrun condition may occur in which the amount of data in the buffer cannot meet current processing demands. In addition, the display control unit is configured to monitor an amount of data available for processing within the buffer. In response to determining the amount of data has fallen to a threshold level, the display control unit conveys an indication that prevents the data storage device from entering or remaining in the reduced power state. Subsequently, the display control unit conveys a request for data to the data storage device which will not be in the reduced power state and the request for data will not incur the increased access latency.

In various embodiments, the threshold level of the buffer is based at least in part on how much latency can be tolerated by the display control unit when retrieving data. When the amount of data in the buffer falls to a given level, it is determined that increased data access latencies cannot be tolerated. Therefore, the data storage device, and potentially one or more other devices on the data path, are prevented from entering a state that would increase the data access latency.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
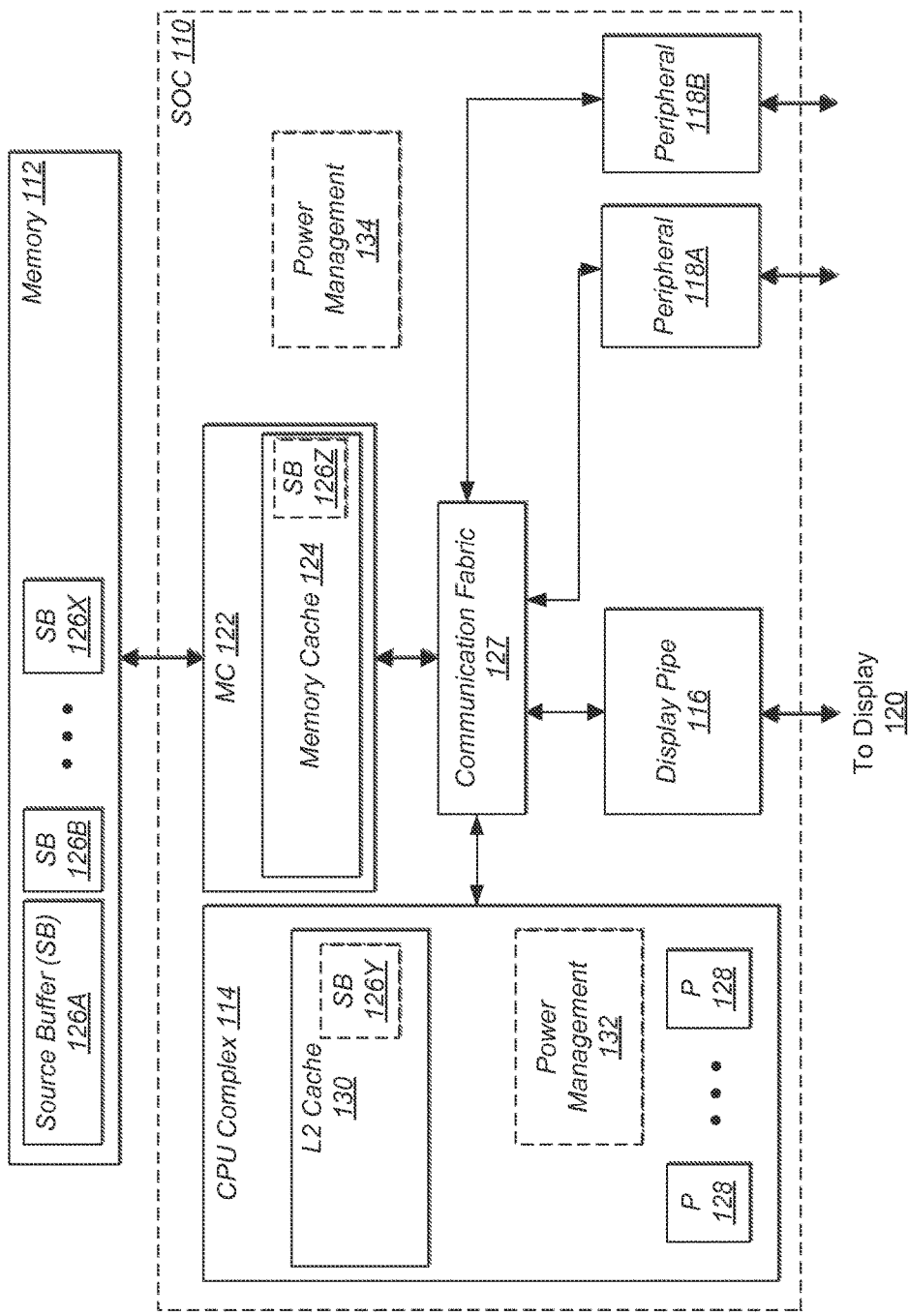
FIG. 1 is a block diagram of one embodiment of a system on a chip (SOC) coupled to a memory and a display.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

While the techniques described herein are susceptible to various modifications and alternative forms, specific embodiments thereof are shown by way of example in the drawings and will herein be described in detail. It should be understood, however, that the drawings and detailed description thereto are not intended to limit the techniques to the particular form disclosed, but on the contrary, the intention is to cover all modifications, equivalents and alternatives falling within the spirit and scope of the present embodiments as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a display control unit . . . ." Such a claim does not foreclose the system from including additional components (e.g., a processor, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Turning now to FIG. 1, a block diagram of one embodiment of an SOC 110 is shown coupled to a memory 112. As implied by the name, the components of the SOC 110 may be integrated onto a single semiconductor substrate as an integrated circuit "chip." In some embodiments, the components may be implemented on two or more discrete chips in a system. However, for purposes of discussion SOC 110 will be used as an example herein. In the illustrated embodiment, the components of the SOC 110 include a central processing unit (CPU) complex 114, a display pipe 116, peripheral components 118A-118B (more briefly, "peripherals"), a memory controller 122, and a communication fabric 127. The components 114, 116, 118A-118B, and 122 may all be coupled to the communication fabric 127. The memory controller 122 may be coupled to the memory 112 during use. Similarly, the display pipe 116 may be coupled to the a display device 120 (not shown). A display device may be more briefly referred to herein as a display. In the illustrated embodiment, the CPU complex 114 includes one or more processors 128 and a level two (L2) cache 130. In addition, CPU complex 114 is shown to include power management unit 132. SOC 110 is also shown to include a power management unit 134. It is noted that various embodiments of SOC 110 will include power management circuitry in one or more different locations. For example, processors 128 may include power management circuitry, memory controller 122 may include power management circuitry, and so on. For ease of illustration, power management units (e.g., 132 and 134) are depicted in a prominent manner. However, it is to be understood that the embodiments described herein that utilize power management circuitry are not limited to having such circuitry located within the particular locations depicted. Numerous different configurations for complex 114 are possible and are contemplated.

The display pipe 116 may include circuitry to process one or more still images and/or one or more video sequences for display on a display 120. Generally, for each source still image or video sequence, the display pipe 116 may be configured to generate read memory operations to read the data representing the frame/video sequence from the memory 112 through the memory controller 122. The display pipe 116 may be configured to perform any type of processing on the image data (still images, video sequences, etc.). For example, in various embodiments the display pipe 116 may be configured to scale still images and to dither, scale, and/or perform color space conversion on the frames of a video sequence. The display pipe 116 may also be configured to blend the still image frames and the video sequence frames to produce output frames for display. The display pipe 116 may also be referred to herein as a display control unit. A display control unit may generally be any hardware configured to prepare a frame for display from one or more sources, such as still images and/or video sequences.

In various embodiments, the display pipe 116 may be configured to read from one or more source buffers 126A-126B located in the memory 112, generate frames from the source buffers, and display the resulting frames on the display 120. Accordingly, the frames displayed on the display 120 may not be directly retained during normal, dynamic operation. However, if static content is detected for a set of successive frames (an idle screen condition), the display pipe 116 may be configured to compress the resulting frame and write the compressed frame to memory 112. As depicted, in some embodiments source buffer data may be cached in memory cache 124 (e.g., SB 126Z), L2 Cache 130 (e.g., SB 126Y), or otherwise.

In various embodiments, one or more of the components in SOC 110 may be capable of entering a reduced power state. For example, L2 cache 130 and/or memory cache 124 may have one or more operational power states. In various embodiments, power management circuitry may monitor various system conditions and cause one or more components to enter a reduced power state. For example, power management unit 132 may monitor activity and conditions within CPU complex 114 and cause L2 cache 130 to enter a reduced power state if certain conditions are met. Processor 128 may similarly include such circuitry configured to monitor conditions and place various components within the respective processor in a reduced power state.

While such reduced power states may have the benefit of reducing power consumption, such states may also result in reduced performance. For example, if a memory access is targeted to the L2 cache 130 at a time when the L2 cache 130 is in a reduced power state, it may first be necessary to awaken the L2 cache 130 (and/or circuitry associated with the cache) in order to access the cache. Generally speaking, "awakening" the cache (or other device) means causing at least some portion of the cache and/or related circuitry to enter or remain in a power state that does not incur an increased access latency. The additional time required to first awaken the cache results in an increased delay in servicing the memory access, which in turn may reduce overall system performance. It is noted that to "wake" or "awaken" the cache does not necessarily mean the cache is asleep, per se. Rather, the cache may be in a reduced power state that is not fully asleep. Alternatively, the cache may currently be in the desired higher power state. In such a case, the waking or awakening the cache may cause the cache to remain in such a state. These and other embodiments are possible and are contemplated.

The display 120 may be any sort of visual display device. The display device may include, for example, touch screen displays for mobile devices such as smart phones, tablets, etc. Display device 120 may include liquid crystal display (LCD), light emitting diode (LED), plasma, cathode ray tube (CRT), etc. The display 120 may be integrated into a system including the SOC 110 (e.g. a smart phone or tablet) and/or may be a separately housed device such as a computer monitor, television, or other device. The display 120 may also include one or more displays coupled to the SOC 110 over a network (wired or wireless).

In some embodiments, the display 120 may be directly connected to the SOC 110 and may be controlled by the display pipe 116. That is, the display pipe 116 may include hardware (a "backend") that may provide various control/data signals to the display, including timing signals such as one or more clocks and/or the vertical blanking interval and horizontal blanking interval controls. The clocks may include the pixel clock indicating that a pixel is being transmitted. The data signals may include color signals such as red, green, and blue, for example. The display pipe 116 may control the display 120 in real-time, providing the data indicating the pixels to be displayed as the display is displaying the image indicated by the frame. The interface to such a display 120 may be, for example, VGA, HDMI, digital video interface (DVI), a liquid crystal display (LCD) interface, a plasma interface, a cathode ray tube (CRT) interface, any proprietary display interface, etc.

The CPU complex 114 may include one or more CPU processors 128 that serve as the CPU of the SOC 110. The CPU of the system includes the processor(s) that execute the main control software of the system, such as an operating system. Generally, software executed by the CPU during use may control the other components of the system to realize the desired functionality of the system. The CPU processors 128 may also execute other software, such as application programs. The application programs may provide user functionality, and may rely on the operating system for lower level device control. Accordingly, the CPU processors 128 may also be referred to as application processors. The CPU complex may further include other hardware such as the L2 cache 130 and/or and interface to the other components of the system (e.g., an interface to the communication fabric 127).

The peripherals 118A-118B may be any set of additional hardware functionality included in the SOC 110. For example, the peripherals 118A-118B may include video peripherals such as video encoder/decoders, image signal processors for image sensor data such as camera, scalers, rotators, blenders, graphics processing units, etc. The peripherals may include audio peripherals such as microphones, speakers, interfaces to microphones and speakers, audio processors, digital signal processors, mixers, etc. The peripherals may include interface controllers for various interfaces external to the SOC 110 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The memory controller 122 may generally include the circuitry for receiving memory operations from the other components of the SOC 110 and for accessing the memory 112 to complete the memory operations. The memory controller 122 may be configured to access any type of memory 112. For example, the memory 112 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 122 may include various queues for buffering memory operations, data for the operations, etc., and the circuitry to sequence the operations and access the memory 112 according to the interface defined for the memory 112.

In the illustrated embodiment, the memory controller 122 may include a memory cache 124. The memory cache 124 may store data that has been read from and/or written to the memory 112. The memory controller 122 may check the memory cache 124 prior to initiating access to the memory 112. Power consumption on the memory interface to the memory 112 may be reduced to the extent that memory cache 124 hits are detected (or to the extent that memory cache 124 allocates are performed for write operations). Additionally, latency for accesses that are memory cache 124 hits may be reduced as compared to accesses to the memory 112, in some embodiments.

The communication fabric 127 may be any communication interconnect and may utilize any suitable protocol for communicating among the components of the SOC 110. The communication fabric 127 may be bus-based, including shared bus configurations, cross bar configurations, hierarchical buses with bridges, or otherwise. The communication fabric 127 may also be packet-based, or otherwise.

It is noted that the number of components of the SOC 110 (and the number of subcomponents for those shown in FIG. 1, such as within the CPU complex 114) may vary from embodiment to embodiment. There may be more or fewer of each component/subcomponent than the number shown in FIG. 1.

As noted, during operation the display pipe 116 is generally configured to fetch image data from source buffers 126A-126B in the memory 112 and generate output frames. However, in a system which utilizes power management techniques, it is possible that a request to fetch image data may seek access to a memory device (e.g., cache, memory, buffer, etc.) that is currently in a reduced power state. If such is the case, it may then be necessary to first awaken the particular device before the desired access can be performed. In various embodiments, SOC 110 is configured to awaken such devices in advance of such accesses so that the particular device is already awake by the time the access arrives or is otherwise needed. Further details of such embodiments will be discussed below.

Figure 2:
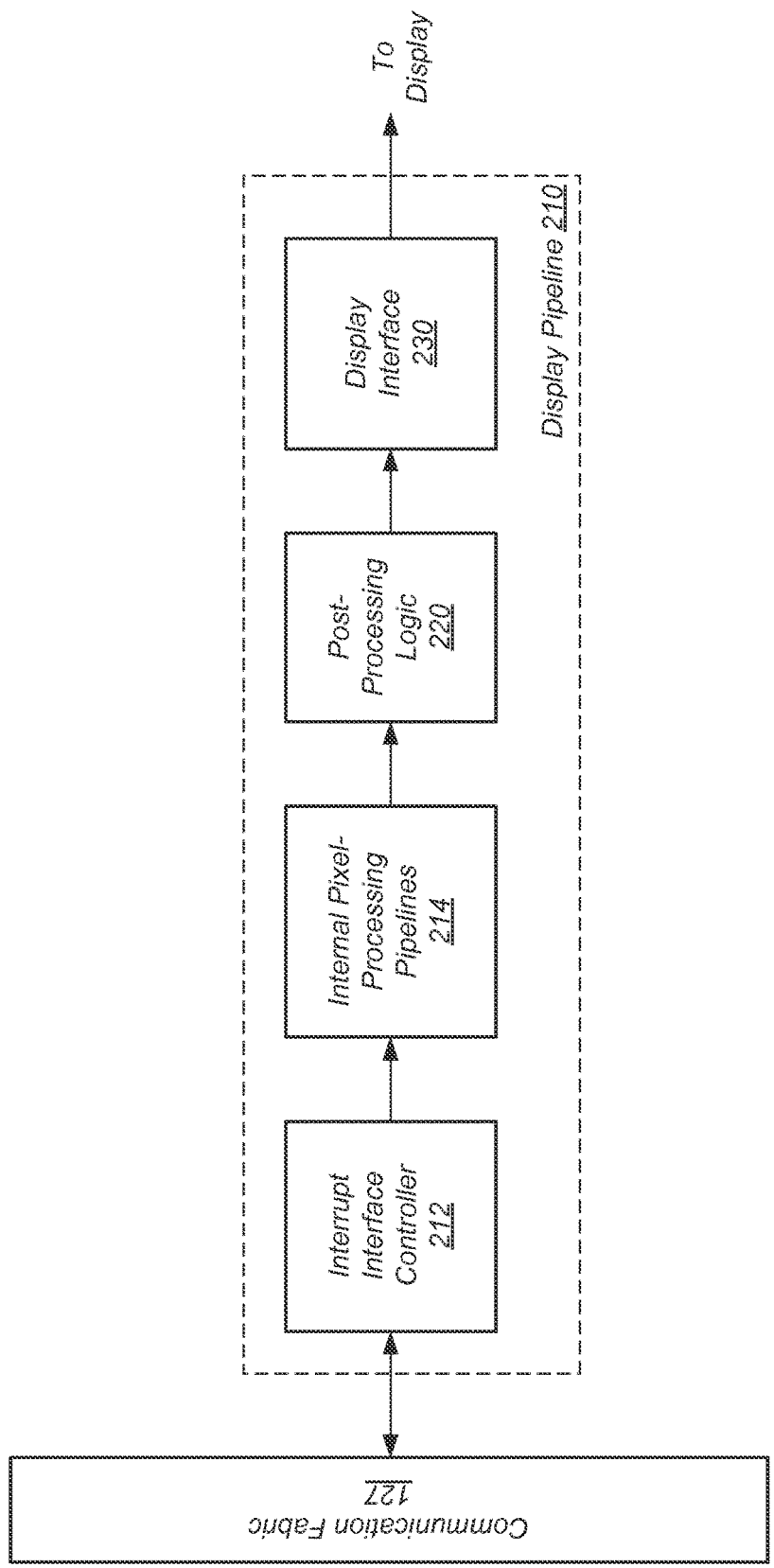
FIG. 2 is a block diagram of one embodiment of a display pipeline for use in a SoC.

Turning now to FIG. 2, a generalized block diagram of one embodiment of a display pipeline for use in a SoC is shown. Although one display pipeline is shown, in other embodiments, the host SOC (e.g., SOC 110) may include multiple display pipelines. Generally speaking, display pipeline 210 may be configured to process a source image and send rendered graphical information to a display (not shown).

Display pipeline 210 may be coupled to interconnect interface 250 which may include multiplexers and control logic for routing signals and packets between the display pipeline 210 and a top-level fabric. In some embodiments, the interconnect interface 250 may correspond to communication fabric 127 of FIG. 1. Display pipeline 210 may include interrupt interface controller 212. Interrupt interface controller 212 may include logic to expand a number of sources or external devices to generate interrupts to be presented to the internal pixel-processing pipelines 214. The controller 212 may provide encoding schemes, registers for storing interrupt vector addresses, and control logic for checking, enabling, and acknowledging interrupts. The number of interrupts and a selected protocol may be configurable.

Display pipeline 210 may include one or more internal pixel-processing pipelines 214. The internal pixel-processing pipelines 214 may include one or more ARGB (Alpha, Red, Green, Blue) pipelines for processing and displaying user interface (UI) layers. The internal pixel-processing pipelines 214 may also include one or more pipelines for processing and displaying video content such as YUV content. In some embodiments, internal pixel-processing pipelines 214 may include blending circuitry for blending graphical information before sending the information as output to post-processing logic 220.

A layer may refer to a presentation layer. A presentation layer may consist of multiple software components used to define one or more images to present to a user. The UI layer may include components for at least managing visual layouts and styles and organizing browses, searches, and displayed data. The presentation layer may interact with process components for orchestrating user interactions and also with the business or application layer and the data access layer to form an overall solution. The YUV content is a type of video signal that consists of one signal for luminance or brightness and two other signals for chrominance or colors. The YUV content may replace the traditional composite video signal. For example, the MPEG-2 encoding system in the DVD format uses YUV content. The internal pixel-processing pipelines 214 may handle the rendering of the YUV content.

Internal pixel-processing pipelines 214 may also include compression and write-back logic for compressing an output frame and then writing the compressed output frame back to memory when an idle frame condition is detected. Internal pixel-processing pipelines 214 may also include decompression logic for decompressing the compressed output frame and then conveying the result to post-processing logic 220 for as long as the idle frame condition persists.

The post-processing logic 220 may be used for color management, ambient-adaptive pixel (AAP) modification, dynamic backlight control (DPB), panel gamma correction, and dither. The display interface 230 may handle the protocol for communicating with the display. For example, in one embodiment, a DisplayPort interface may be used. Alternatively, the Mobile Industry Processor Interface (MIPI) Display Serial Interface (DSI) specification or a 4-lane Embedded Display Port (eDP) specification may be used. It is noted that the post-processing logic and display interface may be referred to as the display backend.

Figure 3:
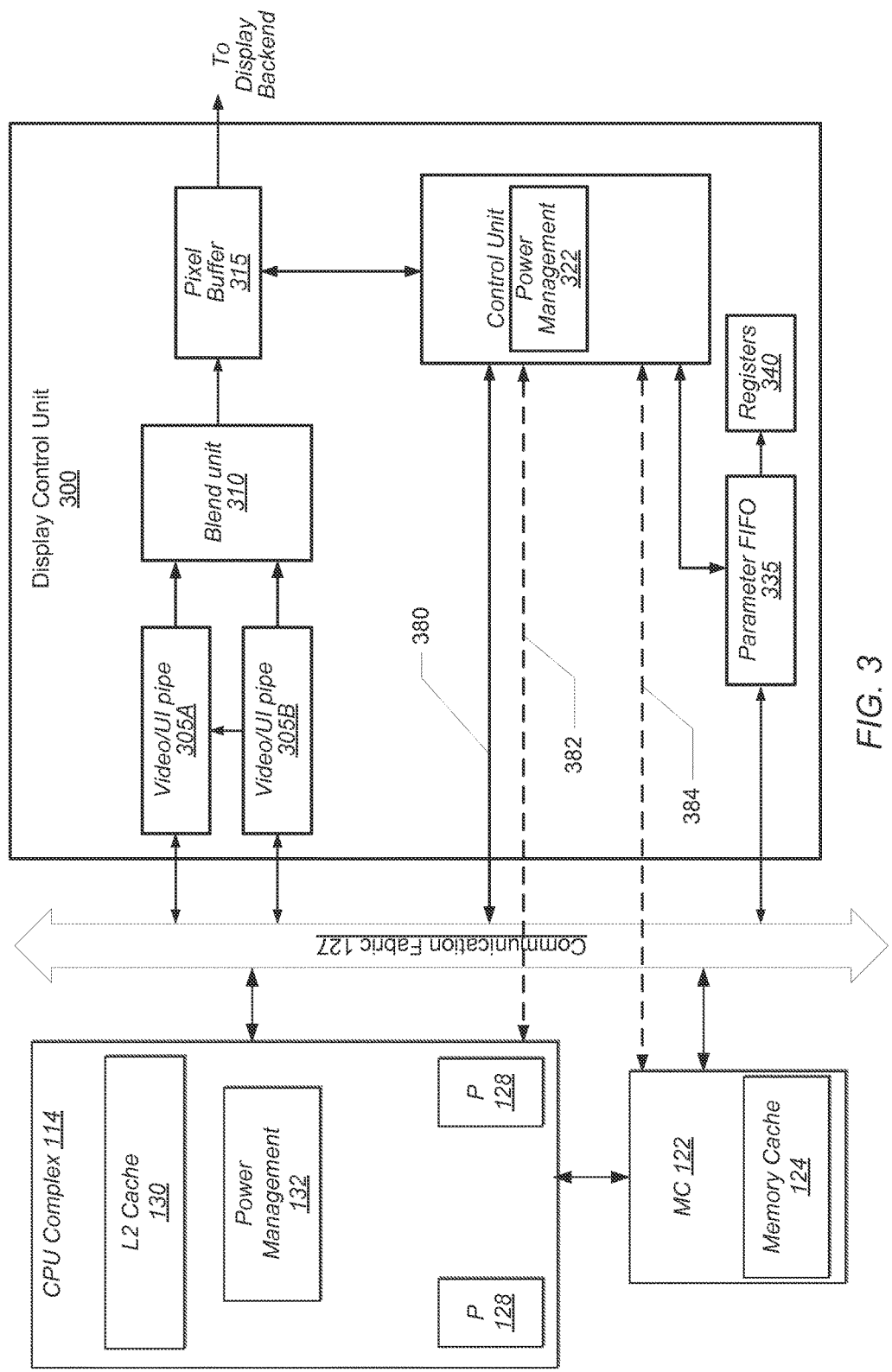
FIG. 3 is a block diagram of one embodiment of a display control unit coupled to a CPU complex.

Referring now to FIG. 3, one embodiment of a display control unit 300 coupled to CPU complex 114 and memory controller 122 is shown. For purposes of economy, components such as generally representing components already described (e.g., such as CPU complex 114 and memory controller 122 in FIG. 1) will have the same reference numeral. Display control unit 300 may represent display pipe 116 included in SoC 110 of FIG. 1. Display control unit 300 may be coupled to communication fabric 127 and to a display backend (not shown). In some embodiments, a display backend may directly interface to the display to display pixels generated by display control unit 300. Display control unit 300 may include functional sub-blocks such as one or more video/user interface (UI) pipelines 305A-305B, blend unit 310, pixel buffer 315, control unit 320, parameter FIFO 335, and registers 340. Display control unit 300 may also include other components which are not shown in FIG. 3 to avoid cluttering the figure. In the example shown, control unit 320 includes a power management unit 322.

Communication fabric 127 couples various functional blocks such that the functional blocks may pass data between one another. Display control unit 300 may be coupled to communication fabric 127 in order to receive video frame data for processing. The display control unit 300 may include one or more video/UI pipelines 305A-B, each of which may be a video and/or user interface (UI) pipeline depending on the embodiment. It is noted that the terms "video/UI pipeline", "pixel processing pipeline", and "pixel generation logic" may be used interchangeably herein. In other embodiments, display control unit 300 may have one or more dedicated video pipelines and/or one or more dedicated UI pipelines. Each video/UI pipeline 305 may fetch a video or image frame from a buffer coupled to system bus 350. The buffered video or image frame may reside in a system memory such as, for example, system memory 112 from FIG. 1. Each video/UI pipeline 305 may fetch a distinct image and may process the image in various ways, including, but not limited to, format conversion (e.g., YCbCr to ARGB), image scaling, and dithering. In some embodiments, each video/UI pipeline 305 may process one pixel at a time, in a specific order from the video frame, outputting a stream of pixel data, and maintaining the same order as pixel data passes through.

Blend unit 310 may receive a pixel stream from one or more video/UI pipelines 305. If only one pixel stream is received, blend unit 310 may simply pass the stream through to the next sub-block. However, if more than one pixel stream is received, blend unit 310 may blend the pixel colors together to create an image to be displayed. In various embodiments, blend unit 310 may be used to transition from one image to another or to display a notification window on top of an active application window. For example, a top layer video frame for a notification, such as, for a calendar reminder, may need to appear on top of an internet browser window. The calendar reminder may comprise some transparent or semi-transparent elements in which the browser window may be at least partially visible, which may require blend unit 310 to adjust the appearance of the browser window based on the color and transparency of the calendar reminder.

The output of blend unit 310 may be a single pixel stream composite of the one or more input pixel streams. The pixel stream output of blend unit 310 may be sent to pixel buffer 315. In other embodiments, the pixel stream may be sent to other target destinations. For example, the pixel stream may be sent to a network interface. It is noted that while a pixel buffer 315 is described herein, other structures configured to store data are possible and are contemplated.

Pixel buffer 315 may be configured to store pixels output from blend unit 310. In various embodiments, buffer 315 may operate as a queue or first-in-first-out (FIFO) structure in which data stored in the buffer is read out in the same order it was written. Such a buffer may comprise RAM or registers and may utilize pointers to the first and last entries in the FIFO. During "normal" operation, pixel buffer 315 may be the interface to the display backend (not shown), which may control the display in order to display the pixels generated by display control unit 300. In one embodiment, the display backend may read pixels at a rate from output blend unit 310 according to a pixel clock. The rate may depend on the resolution of the display as well as the refresh rate of the display. For example, a display having a resolution of N×M and a refresh rate of R frames per second may have a pixel clock frequency based on N×M×R. On the other hand, pixel buffer 315 may be written by blend unit 310 as pixels are generated by blend unit 310. In some instances, the rate at which display control unit 300 generates pixels may be faster than the rate at which the pixels are read, assuming that data is provided to display control unit 300 from the memory (not shown) quickly enough. The pixels in pixel buffer 315 may thus be a measure of a margin of safety for display control unit 300 before erroneous operation is observed on the display.

In other cases, the pixel buffer 315 may not be able to provide data fast enough for proper display and an underrun condition may occur. In order to prevent such cases, methods and mechanisms to reduce the likelihood of underrun are described below. Generally speaking, given a current processing rate of data stored in the pixel buffer 315, and knowledge of a typical data access latency, it can be determined whether the amount of data stored in the pixel buffer 315 will be adequate to prevent an underrun condition—assuming continued processing of pixel data at a given rate and continued requests for data with a given access latency. For example, a minimum amount of data can be determined to be needed to continue to satisfy processing demands. If the amount of data were to fall any lower, then it may not be possible to meet the current processing demands. Such a scenario could happen if data access latencies were to suddenly increase (e.g., due to a cache being in a reduced power state). Therefore, as described herein, the methods and mechanisms may prevent the increased access latencies to avoid this scenario from occurring.

Control unit 320 may receive various control signals and include control logic for managing the overall operation of display control unit 300. For example, control unit 320 may receive a signal to indicate a new video frame is ready for processing. In some embodiments, this signal may be generated outside of display control unit 300 and in other embodiments display control unit 300 may generate the signal. In some embodiments, display control unit 300 may include a parameter buffer (e.g., FIFO 335). The parameter FIFO 335 may store values to be written to the configuration registers 340 for subsequent frames. The same configuration of registers may be used for multiple frame generations, in some embodiments, and thus the parameter FIFO 335 may include data that indicates how many frames should be processed with a given configuration before a new configuration is used. The parameter FIFO 335 may further store register addresses of the configuration registers 340 and data to be written to those registers 340. The parameter FIFO 335 may thus be a mechanism to store a stream of frame processing in display control unit 300 and then permit display control unit 300 to perform the stream. Various other parameters that display control unit 300 uses to control how the various sub-blocks manipulate the video frame may also be stored in registers 345. Registers 345 may include data setting input and output frame sizes, setting input and output pixel formats, location of the source frames, and destination of the output.

In some embodiments, control unit 320 may designate a quality of service (QoS) state for each pixel fetch request and/or writeback request. The QoS states may be utilized to control the priority of requests that are sent to memory from display control unit 300. In one embodiment, there may be three QoS levels—green, yellow, and red corresponding to low, medium, and high levels of priority, respectively. The QoS information may be generated per request and/or may be communicated to the communication fabric and memory subsystem via sideband signaling.

As discussed above, various power management mechanisms may exist in the SOC 110. At various times, various memory devices (caches, etc.) may be placed in a reduced power state to reduce power consumption. Because these reduced power states can increase access latencies and negatively impact performance as described above, in various embodiments display control unit 300 is configured to alter the power management behavior of the system in order to mitigate these negative effects. In the example of FIG. 3, control unit 320 includes power management unit 322. It is noted that power management unit 322 need not be located within control unit 320. Rather, power management unit 322 may be located elsewhere within display control unit 300. In some embodiments, power management unit 322 could be external to display control unit 300.

During operation, power management unit 322 may be configured to monitor the state of pixel buffer 315. As described above, display control unit 300 (e.g., via pipes 305) may be configured to generate requests for data. Responsive to these requests, data is returned, processed, and used to populate pixel buffer 315. As noted, if the amount of data stored in pixel buffer 315 is inadequate to service current display needs, an underrun may occur which may cause undesirable visual artifacts, delays, or otherwise. One possible cause (or contributing factor) of an underrun condition may be an increased latency in servicing requests for data. For example, if control unit 300 requests data and the return of requested data is delayed, then the amount of data in buffer 315 may not be adequate to service current processing needs. In other words, the processing rate of the data may be such that the available data is consumed and an underrun condition occurs. Consequently, ensuring the pixel buffer 315 has enough data is desired.

Because various memory elements (cache, memory, etc.) storing data may be placed in reduced power states, it is possible the a request for data from the display control unit 300 may seek to access such an element while it is in reduced power state. When this occurs, an increased latency results as the device must first be awakened before the access can be performed. This increased latency may in turn contribute to possible underrun within the display control unit 300. In order to avoid such scenarios, in various embodiments at least the amount of data currently stored in the buffer 315 is monitored. If the amount of data stored in the buffer 315 falls below a given level, then an indication may be provided (e.g., indication 380 or 382) which serves to ensure one or more memory elements in CPU complex 114 (e.g., cache 130, etc.) are not currently in a power state that would result in an increased access latency. In some embodiments, such an indication may be provided based at least in part on an anticipated forthcoming data access request by the display control unit 300 (e.g. based on current access patterns, stride of accesses, etc.). In other embodiments, the indication may be conveyed without regard to any particular anticipated data access request. Further, in various embodiments the indication is not itself a data access request. In some embodiment, the indication could be a "dummy" data access request which serves to wake the storage device and whose data is simply discarded. In other words, the indication may be a request for data, but it is not a request for desired data. In other embodiments, the indication is a sideband signal. Various such embodiments are possible and are contemplated.

For example, as shown in FIG. 3 an indication may be provided from the display control unit 300—such as indication 380, 382, or 384. Various possible indications are possible and are contemplated depending on the embodiment. For example, in some embodiments the indication 380 may be a transaction that conveyed via fabric 127. In other embodiments, a non-transaction based control signal (382 or 384) may be provided (e.g., out of band, or otherwise). In various embodiments, a combination of such indications may be used. Generally speaking, the indication serves to ensure that a memory/storage elements that may be storing desired data is not in a state that will increase access latency (e.g., a reduced power state). For example, the indication may be a "wake up" signal which serves to awaken a cache if it is in a reduced power state. If the particular cache is already awake, then the indication may serve to ensure it remains awake for at least a given period of time. Such a period of time may be programmable (e.g., via registers within power management unit 132 or 322, etc.). Whichever indication(s) is used, the indication will generally precede a request for data generated by the display control unit 300. In this manner, when the request is generated and conveyed, the device(s) storing the requested data will not be a reduced power state or other state that would increase access latency.

It is noted that the display control unit 300 illustrated in FIG. 3 is merely an example. In other embodiments, different functional blocks and different configurations of functional blocks may be possible depending on the specific application for which the display control unit is intended. For example, more than two video/UI pipelines may be included within a display control unit in other embodiments. Additionally, two or more units shown separately within display control unit 300 may be combined within a single functional sub-block in another embodiment.

Figure 4:
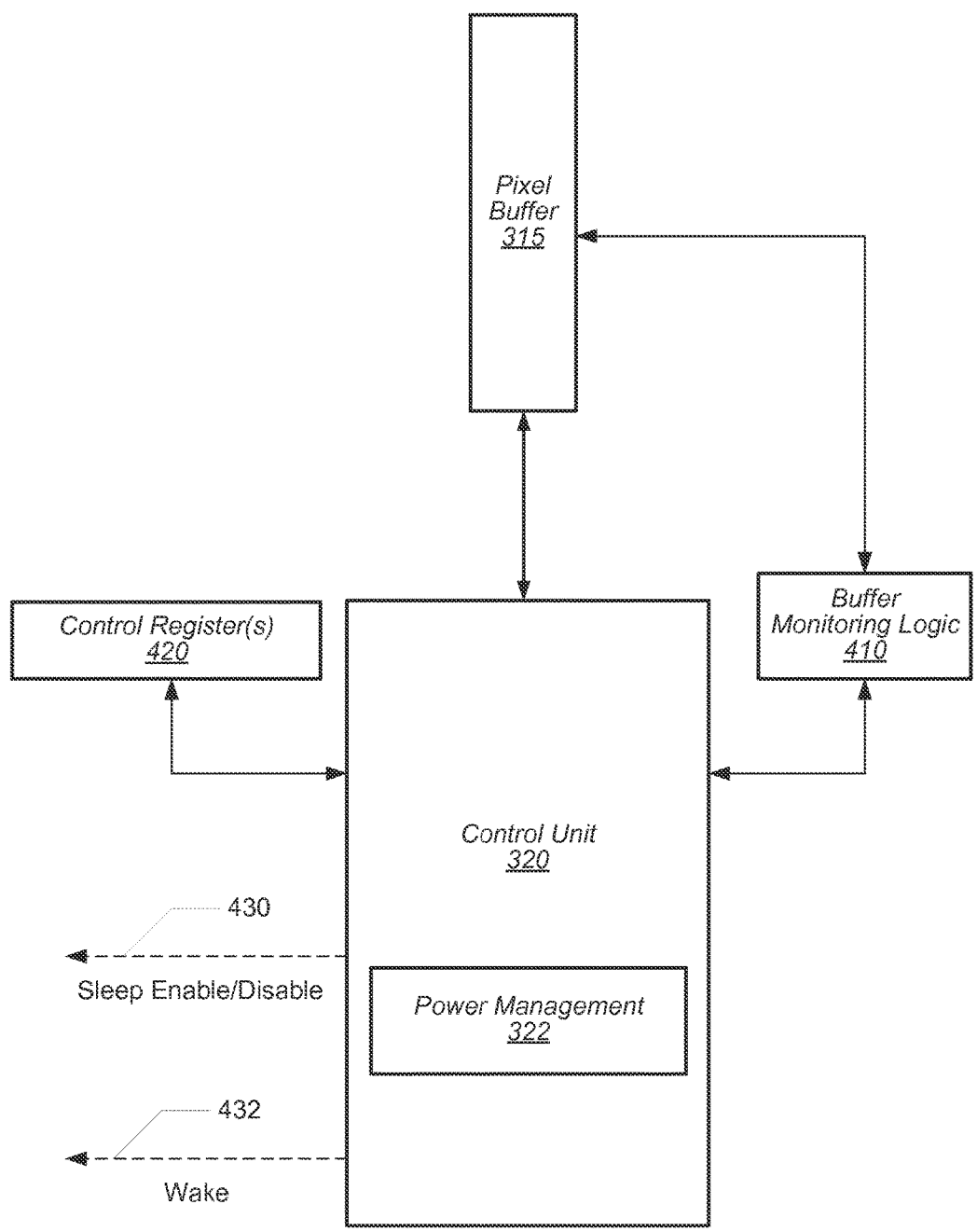
FIG. 4 is a block diagram of one embodiment of power management associated circuitry in a display control unit.

Turning now to FIG. 4, a block diagram of one embodiment of a portion of display control unit 300 is shown. In the example, pixel buffer 315 is shown coupled to buffer monitoring logic 410 and control unit 320. Also shown are control registers 420 and power management 322. While buffer monitoring logic 410, power management 322, and control registers 420 are depicted as residing within or without particular units, the depiction is exemplary only. In various embodiments, the functionality of each of these units (322, 410, 420) may be integrated with other units (shown or not shown), combined in various ways, and so on.

Buffer monitoring logic 410 is configured to monitor the state of pixel buffer 315. In various embodiments, the monitored state includes an amount of data stored in the buffer 315. In various embodiments this amount of data may represented as an absolute value (e.g., X pixels, X bytes, etc.). In other embodiments, this amount of data may represented as a relative amount of data (e.g., ½ full, ¼ full, etc.). If the amount of data stored in the buffer 315 falls to a threshold level, then power management unit 322 may be configured to generate an indication that seeks to ensure a memory device storing data is not in a reduced power (or other latency increasing) state. In various embodiments, the threshold level may be programmable and may be indicated by control register values 420. Alternatively, the control registers 420 may store information regarding a configuration of the system. Such configuration information may then be used by logic within the display control unit 300 to determine a threshold value. This control register(s) 420 may or may not be located within the display control unit 300 itself.

In some embodiments, the threshold used to determine whether an indication is conveyed is fixed at a particular value. In other words, the value may be permanently set. Alternatively, the value may be programmable but may not vary during ordinary operation (e.g., in contrast to a reset, configuration operation, etc.). In yet other embodiments, the threshold may vary during ordinary operation. In such embodiments, various heuristics may be utilized to determine how much data is needed in the pixel buffer 315 to avoid an underrun condition. For example, the resolution of the display, the refresh rate of the display, the type of application currently being processed, whether or not an idle screen condition is detected (e.g., static content is detected for a number of successive frames), the number of outstanding memory transactions, the QoS status of outstanding memory transactions, the status of other functional blocks in the host SoC, the number of received but unprocessed pixels in the pixel generation logic, and so on, may be used as factors in determining where the current threshold should be set. In some cases, threshold values may be calculated during runtime. In other embodiments, various values may be determined experimentally (e.g., using suites of applications, simulations, etc.) and a table created to select various threshold values in dependence on one or more conditions. Such a table may then be used during operation, rather than computing such values during runtime. These and other embodiments are possible and are contemplated.

In the discussion above of FIG. 3, the indication conveyed by the display control unit 300 was described, in one example, as an indication that serves to awaken a device or otherwise ensure it is already awake. For example, indication 432 may generally represent this type of indication. However, in other embodiments, a different type of indication may be provided. As shown in FIG. 4, a sleep enable/disable signal 430 may be provided. This type of signal may be used to prevent one or more memory devices from be placed in a reduced power state. In the above discussion of the awaken type signal 432, it was noted that such an indication may also serve to prevent a given device from entering a reduced power state for a given period of time. In such an embodiment, a reduced power state for the device is not disabled per se. Rather, the device is simply prohibited from entering the reduced power state for a limited period of time. In contrast, indication 430 of FIG. 4 may effectively disable a reduced power state for one or more devices until such time as a new indication is provided that permits such a state. It is noted that various embodiments may include both types of indication 430 and 432. In such an embodiment, if a reduced power state is enabled by indication 430, then indication 432 may be used to ensure devices are awake.

As discussed above, in some embodiments data requested by the display control unit 300 may be stored (or potentially stored) in a cache or other device that may be in a reduced power state. By utilizing wake signal 432, the cache may be awakened (if asleep) so that a data request can be serviced without added latency. However, in some embodiments, some data may not be cacheable. Alternatively, it may be known that particular data is not currently cached. In such embodiments, additional circuitry may be included in SOC 110 that prevents the wake signal 432 from waking the cache. For example, display control unit 300 may include circuitry that serves to (effectively) gate the wake signal 432. In such embodiments, conveyance of the signal 432 does not occur if the data to be requested is determined to not be in a cache or other device that would otherwise be awakened by the signal 432. In some embodiments, data corresponding to particular address ranges may be designated as uncacheable. This may be determined at a system level (e.g., operating system), middleware level, or application level in various embodiments. An indication of such uncacheable regions may be provided to the display control unit 300 which then compares accesses and/or anticipated accesses (based on current accesses, stride of accesses, etc.) against these regions. In such a manner, the display control unit 300 may determine whether conveyance of a wake signal 432 is needed in a particular case.

Figure 5:
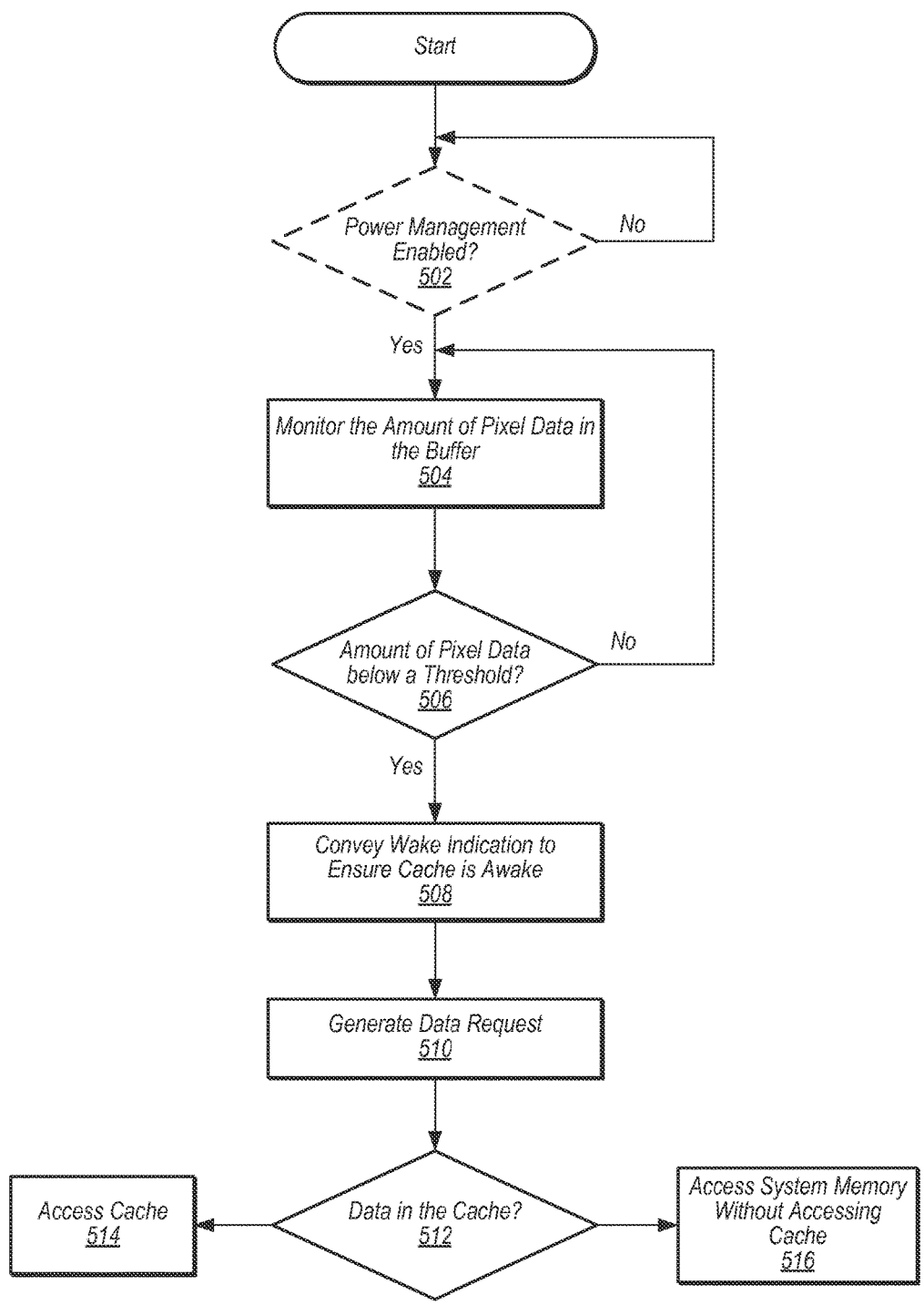
FIG. 5 is a generalized flow diagram illustrating one embodiment of a method for performing power management.

Turning now to FIG. 5, one embodiment of a method for managing power in computing system is shown. For purposes of discussion, a system that includes a display control configured to be coupled to a display device, a system memory configured to store data, and a processor with a cache configured to cache data will be described. In particular, the discussion will describe the processor as potentially caching data in its cache that may be desired by the display control unit. However, as already discussed, other embodiments are contemplated that include the other types of entities that may be placed in a reduced power state that may affect access latencies. The following discussion contemplates such devices and systems as well.

In the example shown, a determination may be made as to whether power management is enabled or disabled where it is an option (block 502). It is noted that this determination may correspond to one or more locations. For example, power management be possible in multiple domains within SOC 110 and may be separately enabled or disabled in each of the domains. As one example, power management may be performed within display unit 300 and L2 Cache 130. In such embodiments, power management settings for the display control unit 300 may include the ability to disable the sleep 430 and/or wake 432 signals previously discussed. In such a case, block 502 may determine that power management is disabled (within the context of the discussion) and not proceed to block 504. It is noted that other power management features of the display control unit 300 could be enabled by the signals 430/432 are disabled. Numerous such embodiments are possible and are contemplated. As noted, the determination in block 502 could include determining whether power management is enabled or disabled for one or more other entities within the SOC 110. For example, it may determine that power management is not enabled for various caches in the system. In such a case, a signal such as wake 430 and/or sleep 432 may be needed and the method again would not proceed to block 504.

Assuming the case where the pertinent power management is enabled (block 502) that may utilize signals 430/432, the method proceeds to block 504 where an amount of data currently stored in the display control unit (e.g., in a pixel buffer) is monitored and/or determined. However, as may be appreciated, elements other than the pixel buffer may be monitored to determine if a given amount of data is present. For example, caches, line buffers, and so on, may be monitored at block 504 to determine if an amount of data has fallen to a threshold level. If the amount of pixel data is not below a threshold (block 506), then the method may continue monitoring the block 504. As discussed above, the threshold may be determined in a variety of ways. In various embodiments, the threshold amount of data may more generally represent a minimum amount of data needed by the display control unit 300 to tolerate a possible increase in access latency that may result due to a cache (or other device) being in a reduced power state. If there are multiple entities that could be in a state that causes increased access latencies (e.g., a cache and a bridge unit on the access path), then the amount of data needed may take into account the worst case scenario for access latency (which may be used to establish the deemed tolerable latency) such as the sum of the increased latencies for each of the entities. These and other such embodiments are possible and are contemplated.

If in block 506 it is determined the amount of data is below the threshold, then an indication may be conveyed (block 508) that serves to ensure entities that might cause an increase in latency due to a reduced power state are not in such a state when they receive a request for data from the display control unit. In some embodiments, the indication is conveyed if a further data request from the display control unit is anticipated. For example, further data for a current frame is needed. In some embodiments, the indication is conveyed irrespective of whether or not a further data request from the display control unit is anticipated. In other words, the indication could be conveyed simply based on the monitored amount of data. Alternatively, if it is known there will not be a further data request from the display control unit (e.g., no more request need be generated for the current frame, or otherwise), an indication that would otherwise be conveyed may be suppressed.

In some embodiments, a processor may potentially be caching data desired by the display control unit. In such a case, indication 508 may be conveyed even though the processor may not, in fact, be caching the desired data. Responsive to the indication (block 508), the processor ensures its cache is not in a state that would increase access latency. For example, if the processor cache is in a reduced power state, the processor may cause the cache to exit the reduced power state and enter a higher power state that has a lower access latency. If on the other hand the cache is not in such a reduced power state, the processor may simply ensure that it is not placed in a reduced power state. In various embodiments, the processor may prevent the cache from entering a reduced power state for a given period of time that is programmable, fixed, or dynamically determined based on current operating conditions.

Subsequent to conveying the indication (block 508), the display control unit may then generate a request for data (block 510). In various embodiments, the data request is targeted to the system memory. Responsive to the data request, a determination is made as to whether the data is in the processor cache (block 512). For example, in various embodiments the processor cache snoops the data request. If the data is cached by the processor, then the processor cache is accessed in order to retrieve the data from the cache (block 514). Given that the previously conveyed indication in block 508 ensured the processor cache will not be in a latency increasing state, the retrieval of the data from the cache may occur with a non-increased latency that would occur if the cache were in a power reduced state. If the data is not currently cached by the processor, then system memory is accessed to retrieve the data and the processor cache is not accessed to retrieve the data (block 516). It is noted that in this context snooping the processor cache is not considered an access of the processor cache to retrieve the data. In various embodiments, if the snoop of the processor cache is a hit (i.e., the desired data is currently in the cache), then further processing of the data request by other entities in the computing system (e.g., by the system memory) may be cancelled.

In the scenario above where the desired data was not in the processor cache, the indication in block 508 was effective to force the processor cache to enter or remain in a non-power reduced state. However, the processor cache was not then accessed (block 516). As such, this scenario clearly illustrates an embodiment in which the display control unit does not know where the data resides, but nevertheless generates the indication (block 508) as a precaution. In this manner, the method and mechanism serves to prevent a possible increase in latency that might occur should a given condition turn out to be true (i.e., that the processor is caching the desired data in this example).

It is noted that the reduced power state described herein need not represent a state in which an entity is fully powered down. Rather, in various embodiments, the reduced power state represents a state in which an attempted access of the entity will incur an increased latency as a result of the entity being in the reduced power state. As such, access times for a given entity may correspond to a given power state of the entity. In some embodiments, an entity may support multiple power states. Additionally, in some embodiments, an entity may support one or more reduced power states that do not result in increased access latencies. In such cases, waking the entity may simply ensure that the entity is not in a power state that increases access latencies. So, for example, if an entity is currently in a reduced power state that does not increase access latency, then the entity may remain in its current power state responsive to receiving a wake or similar indication. In other embodiments, a given device may have multiple different access latencies depending on its power state. In some embodiments, the methods and mechanisms described herein may have knowledge of what reduced power states are currently permitted. For example, system software may set register values accessible by the display control and/or other units that indicate permitted power states for one or more entities within the system. Based on this information, threshold values for data may vary in dependence on the increased latencies that are currently possible (i.e., according to permitted power states).

It is noted that while the above discussion generally describes memory devices (e.g., caches, memory, buffers, etc.) in a reduced power state that may increase access latencies, the methods and mechanisms described herein are not limited to such embodiments. In various embodiments, there may be a variety of types of entities that increase latencies in accessing data. For example, as briefly mentioned above, it may be the case that a bridge unit exists on a data path between a source of the requested data and the requestor (or destination). In cases where data may reside in multiple various locations, numerous entities could be in a state that increases access latencies. For example, various processors (or processor cores) may have local caches that could be storing desired data. In such a case, the local caches may be capable of entering reduced power states. In some cases, one or more cores may be capable of entering reduced power states. Still further, various interfaces may be capable of entering reduced power states. In some cases, desired data may reside on a network attached storage device in which various elements (e.g., routing elements, network interfaces, etc.) along the network path may be capable of reduced power states that may increase access latencies. Consideration of these and other elements are possible and are contemplated.

Figure 6:
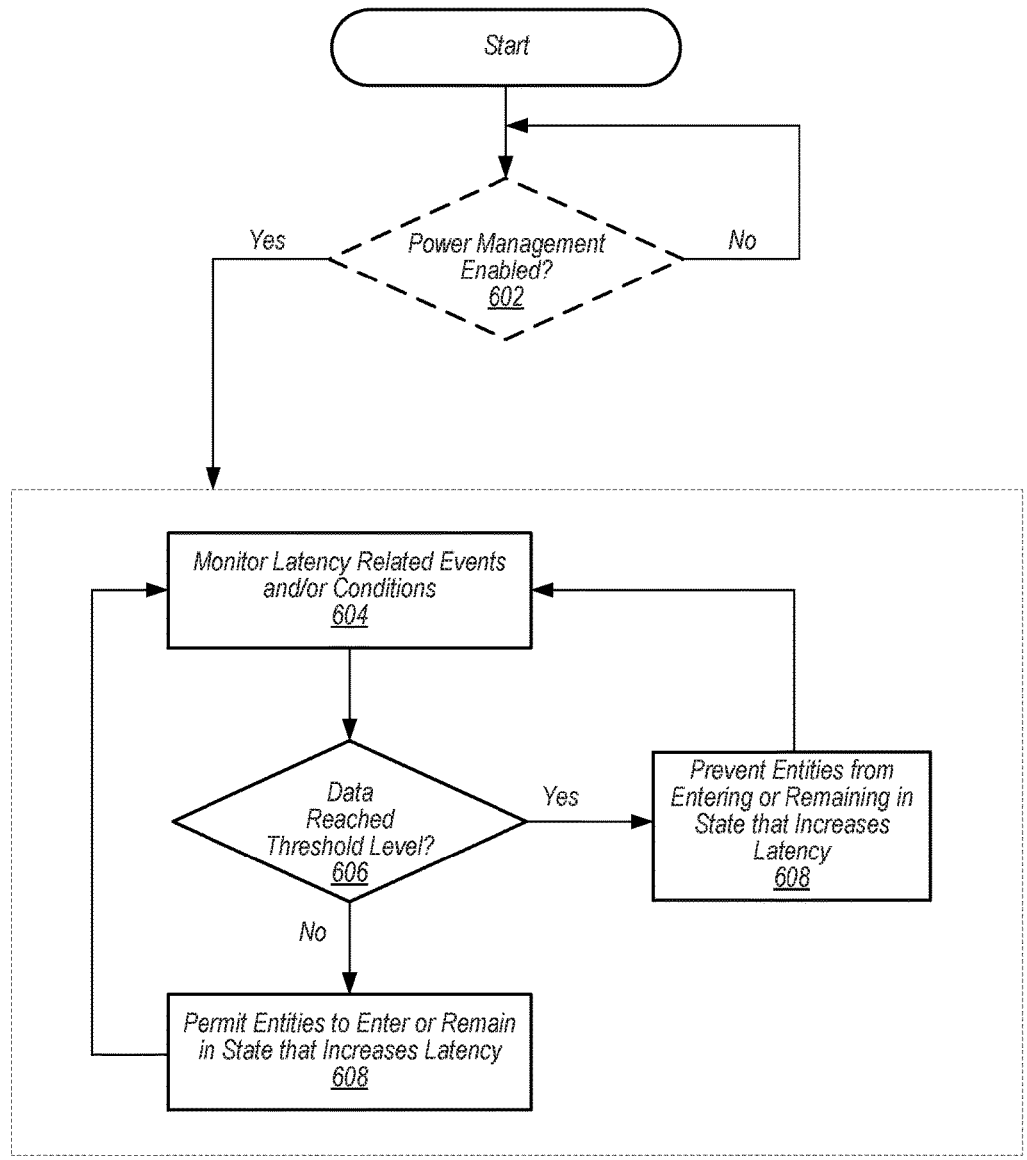
FIG. 6 is a generalized flow diagram illustrating one embodiment of a method for performing power management.

Turning now to FIG. 6, one embodiment of a method for managing power in a system is shown. In block 602 a determination is made as to whether power management is enabled. In various embodiments, this determination may pertain to particular scenarios and not power management in general. For example, in the above discussion the scenario concerned data in a display control unit and avoidance of underrun conditions. In block 604, latency related events and/or conditions are monitored. Such events and/or conditions may include the resolution of a display, the refresh rate of the display, the type of application currently being processed, whether or not an idle screen condition is detected, a number of outstanding memory transactions, the QoS status of outstanding memory transactions, the status of various functional blocks in the system, the number of received but unprocessed pixels in a pixel generation logic, and so on.

Based on the monitored events and/or conditions, a determination is made as to whether enough data is currently available for processing to tolerate a potential increase in data access latency. In the above discussion, the tolerable latency related to the generation of a display and avoidance of potential visual artifacts. However, other embodiments may have different goals in mind. For example, rather than a visual display, the context may be the production of audio. Alternatively, there may be no audio/visual consideration. Rather, it may be the case that a minimum level of performance is desired when performing other types of computations or performing other types of processing. Whatever the context, a particular latency may be deemed tolerable. Any latency greater than the deemed tolerable latency is not deemed tolerable. Based on the deemed tolerable latency, a determination is made as to whether sufficient data is currently available for processing. As discussed above, numerous factors may be used in setting the threshold value.

If the amount of data currently available falls to a given threshold level (block 606), then one or more entities are prevented from entering or remaining in a state that would cause an unacceptable increase in latency. In some embodiments, a wake or similar signal may be conveyed as discussed above. On the other hand, if the available data has not fallen to the threshold level, then the various entities are permitted to enter or remain in their current state. It is noted that the "state" that may cause an increased latency need not be a reduced power state. In the embodiment of FIG. 6, and all embodiments described herein, any state that might result in an increased access latency may be considered. For example, a given device may be operable to perform various administrative tasks that can cause an increase in access latency. For example, a solid state storage device may be capable of initiating garbage collection, TRIM, or other activities that can cause an increase in access latencies. In such an embodiment, an indication may be conveyed similar to the above discussed wake indication. However, rather than altering a power state of the device, the indication may serve to prevent the device from performing these or other types of administrative activities. These and other embodiments are possible and are contemplated.

Figure 7:
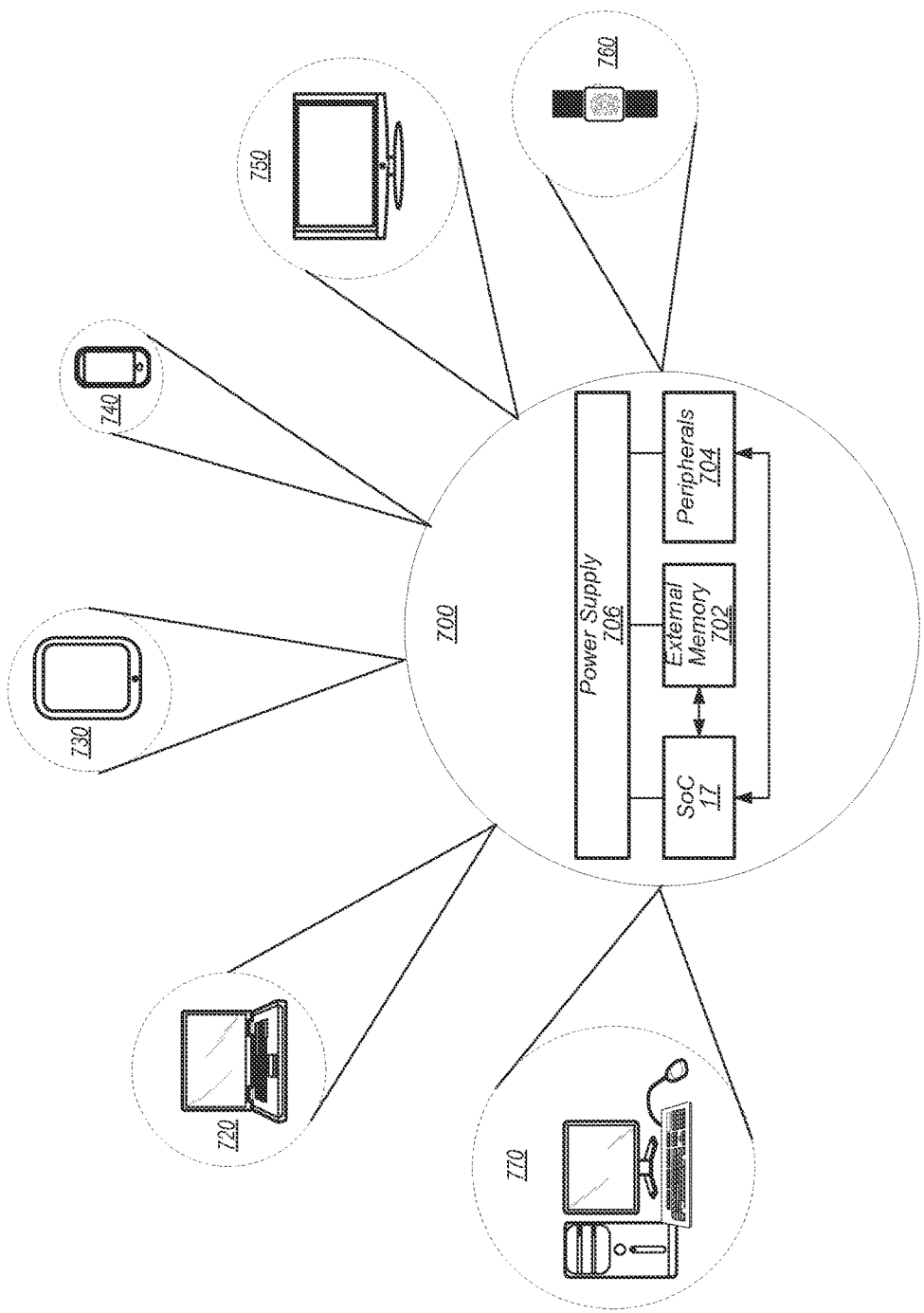
FIG. 7 illustrates a variety of systems that may incorporate the system of FIG. 1.

Turning next to FIG. 7, a block diagram of one embodiment of a system 700 is shown. As shown, system 700 may represent chip, circuitry, components, etc., of a desktop computer 710, laptop computer 720, tablet computer 730, cell phone 740, television 750 (or set top box configured to be coupled to a television), wrist watch or other wearable item 760, or otherwise. Other devices are possible and are contemplated. In the illustrated embodiment, the system 700 includes at least one instance of SoC 110 (of FIG. 1) coupled to an external memory 702.

SoC 110 is coupled to one or more peripherals 704 and the external memory 702. A power supply 706 is also provided which supplies the supply voltages to SoC 110 as well as one or more supply voltages to the memory 702 and/or the peripherals 704. In various embodiments, power supply 706 may represent a battery (e.g., a rechargeable battery in a smart phone, laptop or tablet computer). In some embodiments, more than one instance of SoC 110 may be included (and more than one external memory 702 may be included as well).

The memory 702 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SoC 110 in a chip-on-chip configuration, a package-on-package configuration, or a multi-chip module configuration.

The peripherals 704 may include any desired circuitry, depending on the type of system 700. For example, in one embodiment, peripherals 704 may include devices for various types of wireless communication, such as wifi, Bluetooth, cellular, global positioning system, etc. The peripherals 704 may also include additional storage, including RAM storage, solid state storage, or disk storage. The peripherals 704 may include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a data storage device configured to store data; and
a display control unit, wherein the display control unit is configured to:
retrieve data from the data storage device;
store the retrieved data in a buffer within the display control unit;
monitor an amount of data available for processing within the buffer of the display control unit; and
responsive to determining the amount of data has fallen to a threshold level and determining a new data access request to the data storage device is anticipated, convey only a single indication, said indication not being a request for desired data, that is configured to:
awaken the data storage device and ensure the data storage device remains awake for at least a programmable period of time, if the data storage device is asleep; and
prevent the data storage device from entering a state that increases an access latency of the data storage device for at least the programmable period of time, if the data storage device is not asleep.

2. The system as recited in claim 1, wherein the indication is one of:
an indication that is a dummy request whose data is discarded; and
an indication that does not request data.

3. The system as recited in claim 1, wherein said indication causes the data storage device to enter a power state that is higher than a current power state of the data storage device.

4. The system as recited in claim 1, wherein the programmable period of time is based at least in part on a current processing rate of data within the display control unit.

5. The system as recited in claim 1, wherein if the data storage device is asleep, the display control unit is further configured to prevent awakening the data storage device in response to determining the new data access request requests data corresponding to an address range designated as uncacheable.

6. The system as recited in claim 1, wherein the display control unit is configured to convey the indication to a power management unit coupled to the data storage device.

7. The system as recited in claim 1, further comprising a system memory and a processor, wherein the data storage device is a cache of the processor, and wherein
the display control unit is further configured to generate a request for given data from the system memory;
the cache of the processor is configured to snoop said request for the given data;
in response to determining the cache of the processor is currently caching the given data, access the cache of the processor to retrieve the given data; and
in response to determining the cache of the processor is not currently caching the given data, access the system memory to retrieve the given data without accessing the cache of the processor.

8. A display control unit comprising:
a processing pipeline configured to generate requests for data;
a buffer configured to store data; and
a control unit configured to:
retrieve data from an external data storage device;
store the retrieved data in the buffer within the display control unit;
monitor an amount of data stored in the buffer; and
in response to determining the buffer has less than a threshold amount of data and determining a new data access request to a data storage device is anticipated, convey only a single indication, said indication not being a request for desired data, that is configured to:
  awaken the data storage device and ensure the data storage device remains awake for at least a programmable period of time, if the data storage device is asleep; and
  prevent the data storage device from entering a state that increases an access latency of the data storage device for at least the programmable period of time, if the data storage device is not asleep.

9. The display control unit as recited in claim 8, further comprising a control register configured to store an indication of the threshold.

10. The display control unit as recited in claim 9, wherein said threshold is programmable.

11. The display control unit as recited in claim 8, wherein the indication is one of:
  an indication that is a dummy request whose data is discarded; and
  an indication that does not request data.

12. The display control unit as recited in claim 8, wherein the indication is a dummy data access request.

13. The display control unit as recited in claim 8, wherein the control unit is configured to convey a signal configured to disable a reduced power state of the data storage device.

14. The display control unit as recited in claim 8, wherein a request for given data is targeted to a system memory and the data storage device is a cache of a processor;
  wherein in response to determining the cache of the processor is currently caching the given data, retrieve the given data from the cache of the processor; and
  wherein in response to determining the cache of the processor is not currently caching the given data, retrieve the given data from the system memory rather than accessing the cache of the processor to retrieve the given data.

15. A method comprising:
  retrieving data from a data storage device;
  storing the retrieved data in a buffer within a display control unit;
  monitoring an amount of data available for processing within the buffer; and
  responsive to determining the amount of data has fallen to a threshold level and determining a new data access request to the data storage device is anticipated, conveying only a single indication, said indication not being a request for desired data, configured to:
    awaken the data storage device and ensure the data storage device remains awake for at least a programmable period of time, if the data storage device is asleep; and
    prevent the data storage device from entering a state that increases an access latency of the data storage device for at least the programmable period of time, if the data storage device is not asleep.

16. The method as recited in claim 15, wherein said state comprises a reduced power state.

17. The method as recited in claim 16, wherein responsive to the indication, the method further comprises the data storage device entering a power state that is higher than a current power state of the data storage device.

18. The method as recited in claim 15, wherein determining the new data access request to the data storage device is anticipated is based on a current access pattern.

19. The method as recited in claim 15, wherein said monitoring comprises monitoring an amount of data in a pixel buffer of a display control unit.

20. The method as recited in claim 15, wherein said data storage device is a cache of a processor, and wherein the method further comprises:
  a display control unit generating a request for given data from a system memory;
  a cache of the processor snooping said request for the given data;
  in response to determining the cache of the processor is currently caching the given data, access the cache of the processor to retrieve the given data; and
  in response to determining the cache of the processor is not currently caching the given data, access the system memory to retrieve the given data without accessing the cache of the processor to retrieve the given data.

* * * * *